(12) United States Patent
Yeomans (10) Patent No.: US 9,723,775 B2
(45) Date of Patent: Aug. 8, 2017

(54) TOOL MOUNTING ASSEMBLY FOR AGRICULTURAL IMPLEMENTS

(71) Applicant: Allan James Yeomans, Gold Coast (AU)

(72) Inventor: Allan James Yeomans, Gold Coast (AU)

(*) Notice: Subject to any disclaimer, the term of this patent is extended or adjusted under 35 U.S.C. 154(b) by 190 days.

(21) Appl. No.: 14/748,694

(22) Filed: Jun. 24, 2015

(65) Prior Publication Data

US 2015/0373900 A1 Dec. 31, 2015

(51) Int. Cl.
*A01B 39/22* (2006.01)
*A01B 63/24* (2006.01)
*A01B 63/00* (2006.01)
*F16B 2/14* (2006.01)

(52) U.S. Cl.
CPC .............. *A01B 63/008* (2013.01); *F16B 2/14* (2013.01)

(58) Field of Classification Search
CPC ....... A01B 63/008; A01B 63/20; A01B 63/24; A01B 39/22
USPC .......................................... 172/666, 418, 420
See application file for complete search history.

(56) References Cited

U.S. PATENT DOCUMENTS

| | | | |
|---|---|---|---|
| 491,137 A * | 2/1893 | Rowland ................ | A01B 63/20 172/420 |
| 976,729 A * | 11/1910 | Ellett ..................... | A01B 39/16 172/646 |
| 1,014,470 A * | 1/1912 | Heer ...................... | B65D 90/18 172/420 |
| 1,112,889 A * | 10/1914 | Carter et al. ............. | A01B 3/18 172/742 |
| 1,130,364 A * | 3/1915 | Zelle ........................ | A01B 3/38 172/430 |
| 1,136,579 A * | 4/1915 | Ballard ................... | A01B 63/20 172/420 |
| 1,174,986 A * | 3/1916 | Jeschke ................... | E02F 5/027 172/420 |
| 2,040,044 A * | 5/1936 | Flowers ................. | A01B 63/24 172/244 |
| 2,753,735 A * | 7/1956 | Zahn ...................... | A01B 63/20 172/426 |
| 4,976,566 A | 12/1990 | Yeomans | |
| 6,516,895 B2 * | 2/2003 | Yeomans ............. | A01B 15/025 172/744 |
| 8,220,760 B2 * | 7/2012 | Fetzer .................. | A47B 91/028 248/188.2 |

(Continued)

*Primary Examiner* — Gary Hartmann
(74) *Attorney, Agent, or Firm* — Wood, Phillips, Katz, Clark & Mortimer (57) ABSTRACT

A tool mounting assembly comprising a shank holder having an elongated passage and an elongated tool shank for an earth working or agricultural tool which is received within the passage and which includes a series of longitudinally spaced teeth. A rotatable adjuster is mounted on the shank holder and can cooperate with the teeth for moving the shank longitudinally of the passage to vary the operating depth of the tool. The shank can also cooperate with the adjuster to lock the adjuster against rotation which prevents longitudinal movement of the shank. A retaining member can be located in the passage for cooperation with the shank to hold the shank in this position. The adjuster may also be rotated to a position out of engagement with the shank teeth which allows for longitudinal sliding movement of the shank through the passage.

12 Claims, 9 Drawing Sheets

(56) References Cited

U.S. PATENT DOCUMENTS

2013/0319703 A1* 12/2013 Yeomans ............... A01B 15/02
  172/744
2015/0230390 A1* 8/2015 Green .................. A01B 63/004
  172/1

* cited by examiner

TOOL MOUNTING ASSEMBLY FOR AGRICULTURAL IMPLEMENTS

TECHNICAL FIELD

This invention relates to a tool mounting assembly for the mounting of the shank of an earth working or agricultural toot. The invention in particular relates to a tool mounting assembly which allows adjustment of the height of a tool shank and thus the depth at which an earth working or agricultural tool on the tool shank operates in the soil.

BACKGROUND OF THE INVENTION

It is a common procedure to mount shanks of earth working tools to tool bars of agricultural equipment. The shank can be fixedly secured to the tool bar however it is desirable that the vertical height of the shank and thus the tool carried by the shank be conveniently adjustable. It is also desirable that the mounting arrangement for the shank firmly holds the shank in place when operating the shank and coupled tool in the ground.

A common system for mounting shanks to tool bars is to provide a series of holes in the shank, with cheek plates provided on opposite sides of the shank and mounted to the tool bar and bolts which are passed through the cheek plates and a selected hole or holes in the shank to set the height of the shank and clamp the shank in position. Vertical adjustment of the shank in such an arrangement is time consuming as the bolts have to be removed to allow the shank to be adjusted in height and then reinserted in a further hole or holes and through the shank. Further, the formation of such holes in the shank generally reduces the strength of the shank.

In another system, serrated tracks are provided in the rear of the shank which is again clamped between two cheek plates. Bolts which clamp the plates together also cooperate with the track for positive height location of the shank. This arrangement is also time consuming to adjust and height of the shank in this system is limited by the spacing of the serrations. Thus only "course" adjustment of the shank is possible.

In yet a further arrangement, the tool shank is held in position by a set screw which when tightened engages with the shank with a point contact. Whilst this arrangement can allow finer adjustment of the position of the shank, the arrangement is not particular secure with the result that when subject to load, the tool shank can often move or become dislodged from its set position.

In many situations for example where shallow cultivation is require, it is desirable to be able to accurately adjust the position or height of an earth working tool in the soil whilst at the same time ensuring that the tool does not move away from its set position however the currently known adjustment arrangements for a tool shank to which at tool may be mounted do not fulfil this requirement. It would be desirable therefore if a tool mounting assembly was available which addressed one or more of the above disadvantages.

SUMMARY OF THE INVENTION

The present invention provides in a preferred aspect, a tool mounting assembly comprising a shank holder having an elongated passage therethrough and an elongated tool shank for an earth working or agricultural tool received within said passage, a rotatable adjuster mounted on said shank holder, said rotatable adjuster being adapted in a first position of said shank to cooperate with said shank and cause when rotated adjustment of the position of said shank longitudinally of said passage to vary in use the operating depth of said tool. Preferably, the shank is movable to a second position in cooperation with the adjuster in which it is held in a substantially fixed position longitudinally of the passage, and releasable retaining means for retaining said shank is the second position. Preferably, the shank in its second position cooperates with the adjuster to lock the adjuster against rotation which holds the shank substantially fixed relative to the passage. To permit longitudinal movement of the shank of the passage, the retaining means is release to allow the shank to move from it second to the first position.

Preferably the shank is provided with a plurality of longitudinally spaced teeth and the adjuster is adapted to cooperate with the teeth in the first position of the shank to enable the position of the shank to be adjusted upon rotation of the adjuster. Preferably the shank has a leading end and a trailing end and opposite side faces and at least one of the ends is provided with the longitudinally spaced teeth. Preferably both ends are provided with similar longitudinally spaced teeth which enable the position of the shank in the holder to be reversed for cooperation with the adjuster. Preferably the tool shank includes mounting means for mounting a range of earth working or agricultural tools to the tool shank. Preferably the tool mounting means are provided at least at one end of the tool shank. Preferably similar tool mounting means are provided at each end of the shank. Thus the shank in a particularly preferred form is symmetrical.

Preferably the teeth extend in a transverse direction relative to the longitudinal axis of the shank. Preferably also the teeth extend along a helical path. The teeth may also have an outwardly projecting longitudinally extending rib or ribs on their outer surfaces suitably centrally positioned on the teeth for a purpose described further below. Preferably the teeth have an outer radial surface which is concave and the rib is arranged centrally of and projects outwardly from the outer surface.

The rotatable adjuster is suitably mounted on the shank holder for rotation about an axis extending longitudinally of the shank and passage. Preferably the axis of rotation of the adjuster is substantially parallel to the longitudinal axis of the shank when held in an operative position in the shank holder. Preferably the rotatable adjuster includes a thread which is adapted to cooperate with the teeth of the shank. Suitably the rotatable adjuster includes a main rotatable body and the thread is defined by a helically extending rib on the body adapted to cooperate with and mesh with the teeth on the shank for adjustment of the position of the shank relative to the holder. The rib intersects the passage for engagement with the teeth of the shank.

Preferably means are provided to lock the adjuster against rotation. Most preferably, when the adjuster is fully engaged with the teeth of the shank in the second position of the shank, the adjuster is substantially locked against rotation. Preferably the retaining means holds the adjuster in the fully engaged position with the teeth so that the adjuster is locked against rotation. Preferably in the locked position, the adjuster is adapted to cooperate with one or more rib or ribs on one of more of the teeth. The adjuster for this purpose may include slots or gaps for receiving the rib or ribs of one or more of the teeth. Preferably the adjuster has a plurality of longitudinally extending circumferentially spaced apart lands or ridges defining the slots or gaps therebetween for receiving a rib or ribs of a tooth or teeth to lock the adjuster against rotation. The lands or ridges are rotated with the adjuster into the passage for cooperation with the rib or ribs of the teeth. Preferably to allow the adjuster to rotate, the shank is movable away from the second position where the rib or ribs of the teeth locate in the gaps or slots in the adjuster to the first position where the helical rib still engaged with the teeth whereafter the adjuster may be rotated to cause through the thread like engagement with the teeth on the shank, longitudinally movement of the shank. Release of the retaining means allows the shank to move away from its second position to its first position.

The shank however can be moved away from the adjuster to be fully out of engagement with the adjuster by release of the retaining means to allow for coarse adjustment of the shank for example by sliding it longitudinally of the holder passage. This is permitted by having the passage of partly tapering cross section such that a tapering space is formed in the passage into which the shank may be moved or pivoted upon release of the retaining means so that it can be moved out of register or engagement with the adjuster. Suitably the passage has a maximum width at one end of the holder and tapers inwardly to a position in which it is of constant width and cross-section to the other end of the holder. The constant cross-section region of the passage is suitably substantially complementary to the cross section of the shank.

Preferably also the body of the adjuster can be rotated to a position in which the helically extending rib is not engaged with the teeth so as to allow longitudinal movement of the shank in opposite directions relative to the holder for "coarse" adjustment of the position of the shank. For this purpose, the helical rib extends less than 360 degrees around the body of the adjuster and has opposite ends arranged at different circumferential positions around the main body. Suitably, the circumferential spacing between the ends of the rib defines a gap which is greater than the circumferential width of the teeth on the shank. Preferably the gap is substantially the same as or slightly greater than the distance between opposite side walls of the passage where it is intersected by the rib. The adjuster can thus be rotated to a position where the gap between opposite ends of the helical rib aligns substantially with the passage in the holder. This allows the shank to be moved longitudinally of the passage and freely through the gap and past the adjuster during course adjustment of the position of the shank. The helical rib suitably has a pitch which is greater than the pitch of the teeth. Preferably the pitch of the helical rib is such that rotation of the adjuster between its opposite limit positions defined by the opposite ends of the helical rib and in which the helical rib still remains engaged with the teeth causes the shank to moved a distance substantially the same as the pitch of the teeth.

The adjuster suitably is located within a recess within the shank holder and positioned between spaced apart flanges. The flanges can have aligned apertures to receive a pin or a shaft which also extends through a central opening in the main body of the adjuster so that the adjuster is mounted for its rotation motion. Suitably the adjuster is arranged for rotation with the pin or shaft whereby rotation of the pin or shaft will effect rotation of the adjuster. Suitably the pin or shaft comprises the shaft of a bolt and the main body of the adjuster includes at one end a recess complementary to the head of the bolt whereby the main body of the adjuster can rotate with the bolt. Preferably the shank of the bolt is engaged with a pair of nuts arranged in a cooperative lacking relationship so that rotation of the locking nuts will effect rotation of the bolt shaft and the adjuster. Preferably the recess opens to the passage in the holder through a slot or opening. The helical rib and ridges or lands can project at least partially through the slot or opening to intersect the passage for cooperation with the teeth of the shank.

The retaining means for retaining the shank in a fixed position relative to the holder suitably comprises a wedge member adapted for wedging between the shank suitably an end of the shank and a wall of the passage suitably an end wall of the passage. This will maintain the shank teeth in engagement with the adjuster and the rib or ribs on the teeth between the lands or ridges on the adjuster such that the adjuster is locked against rotation. This thereby holds the shank in a selected fixed position relative to the holder passage and holder. Suitably the wedge member is adapted to cooperate with the tapered portion of the passage such that when urged longitudinally of the passage, the wedge member moves in parallelism inwardly towards the adjacent end of the shank to wedge the shank in position.

Suitably the opposite ends of the passage are of a generally V-shaped or partly V-shaped in cross section and the leading end of the shank is also of V-shaped cross section. Preferably, the V-shaped ends and shank end have an included angle of less than 90 degrees. The wedge member preferably includes a leg which is of V-shaped cross section and complementary to the V-shaped cross section of the passage and shank leading end. The leg of the wedge member is preferably of tapering form in cross section to match the inclination of the inclined surfaces of the passage such that when the wedge member is moved slidably into the passage in contact with the inclined end of the passage, the leg of the wedge member moves inwardly in parallelism. This is achieved by having the operative forward V-sectioned surface of the wedge member at an inclination matching the inclination of the complementary inclined surface of the passage. Preferably the wedge member includes a head and the leg extends from the head. The head suitably is in the form of one or more flanges.

Preferably also, the wedge member includes a longitudinally extending slot. The slot suitably extends parallel to but is located between the wedging surfaces of the leg of the wedge member. Means are suitably provided for urging the wedge member longitudinally of the passage to maintain wedging cooperation between the holder passage and shank. Suitably the urging means comprises resilient means. Preferably the urging means comprises a resilient clip which cooperates with the head of the wedge member and a portion of the holder longitudinally spaced from the wedge member. The clip may comprise an elongated member having means at one end for cooperation with the holder and means at the opposite end which apply a resilient force to the head of the wedge member. The elongated member in use suitably passes through the slot in the wedge member. The elongated member suitably has a head in the form of a torsion spring having an arm which applies a resilient force to the head of the wedge member. The opposite arm of the torsion spring joins an elongated leg part of the spring which passes through the slot in the wedge member. The leg member may have a hook or be deformed at one end for cooperation with the holder. The resilient clip by urging the wedge member longitudinally of the passage will therefore ensure that the wedge member will be self-tightening.

The shank holder is suitably configured for mounting to a tool bar. The shank holder for this purpose may include a surface adapted to be located in a juxtaposed position with a side surface of the tool bar and a flange extending substantially at right angles to the surface for juxtaposition with a top or under surface of the tool bar. Preferably clamping bolts are adapted to extend around the other faces of the tool bar to enable the shank holder to be clamped onto the tool bar.

BRIEF DESCRIPTION OF THE DRAWINGS

Reference will now be made to the accompanying drawings which illustrate a preferred embodiment of the invention and wherein.

DESCRIPTION OF THE PREFERRED EMBODIMENT

Figure 1:
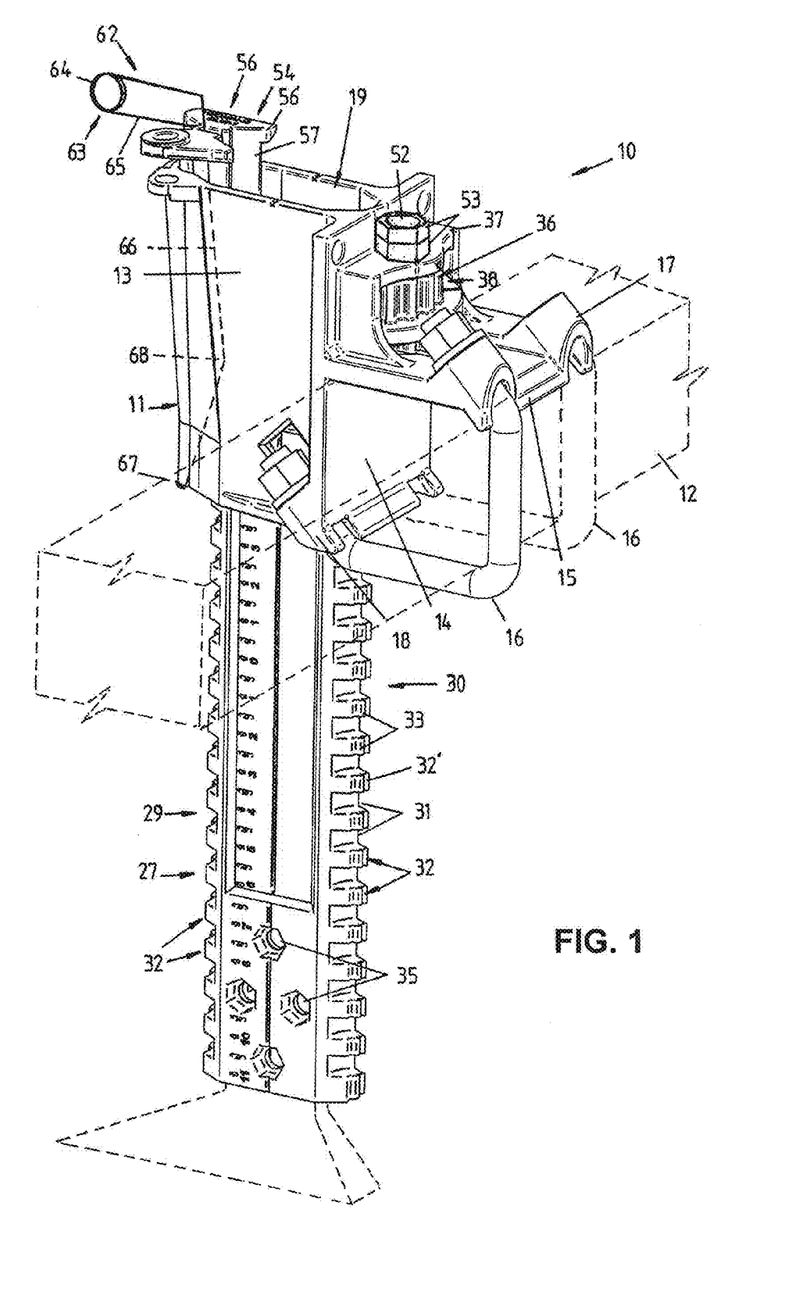
FIG. 1 illustrates the tool mounting assembly according to an embodiment of the present invention supporting a tool shank.
Figure 2:
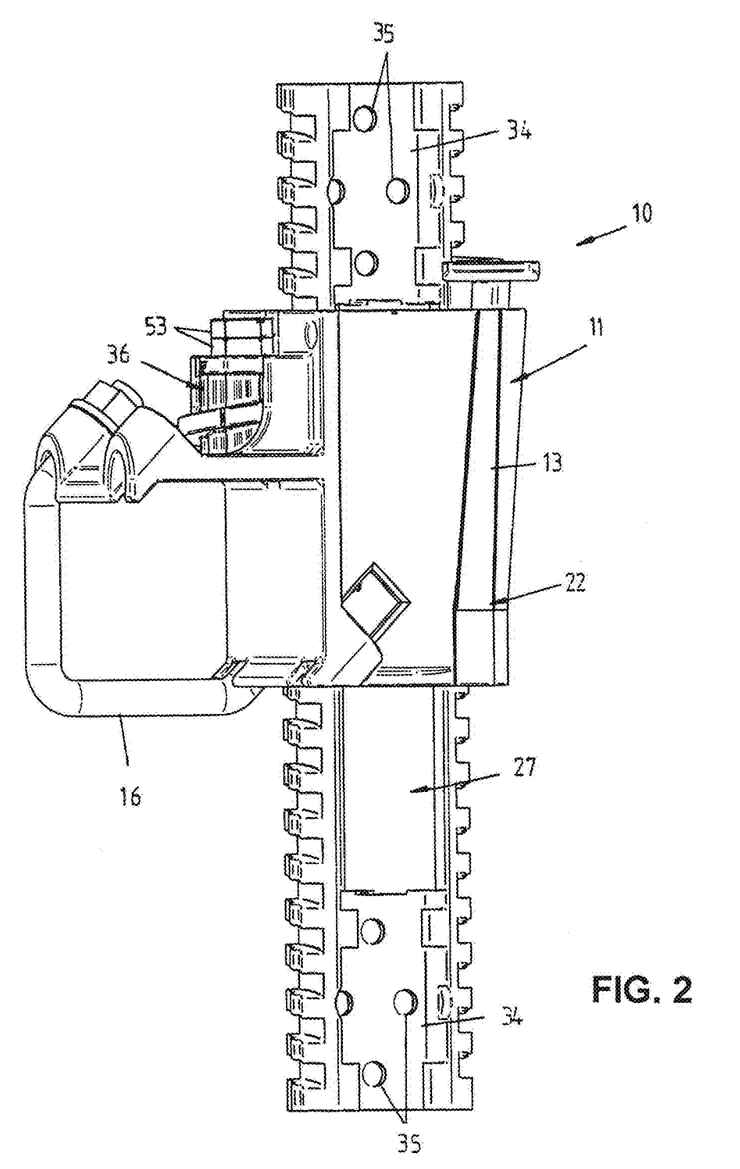
FIG. 2 is a further opposite view of the tool mounting assembly of FIG. 1 with the tool shank in a different position.
Figure 3:
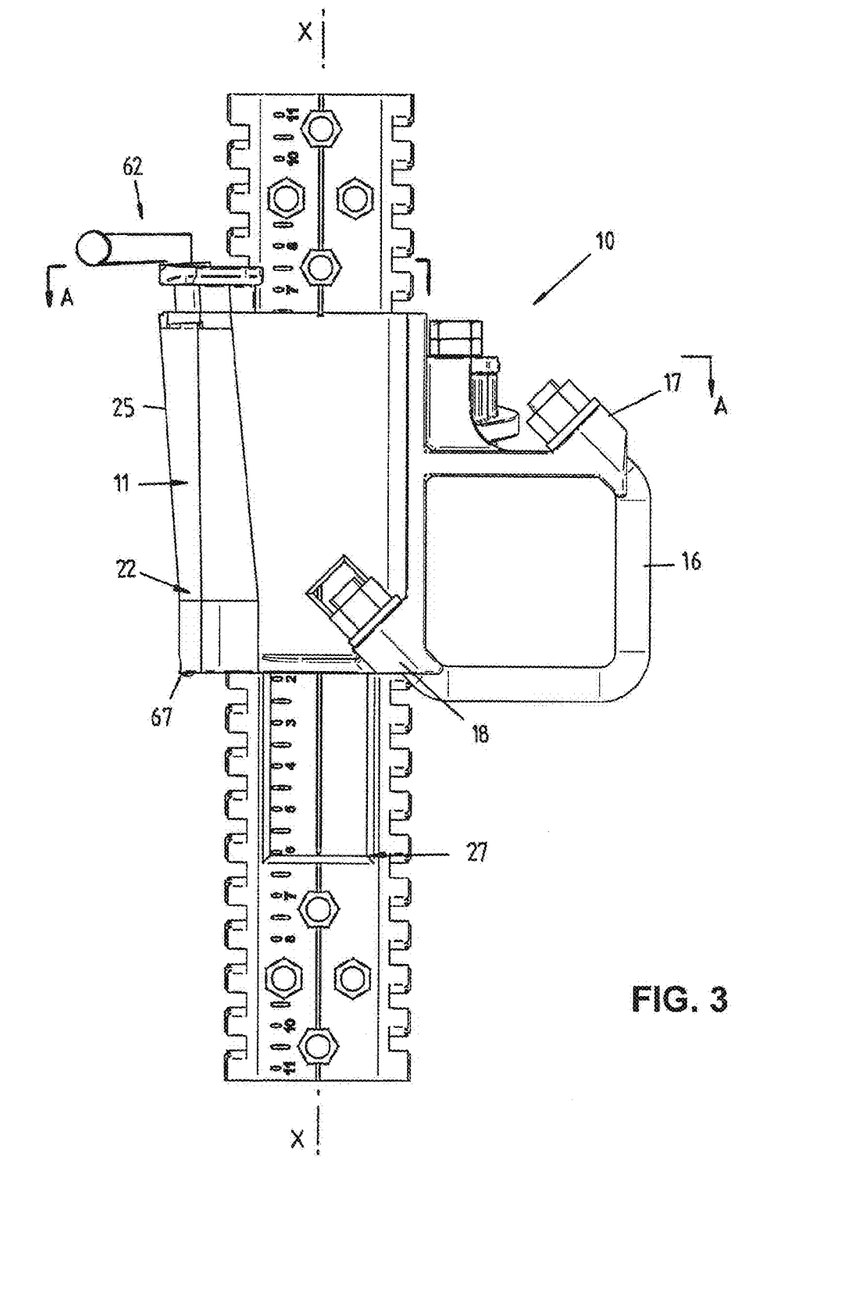
FIG. 3 is a side view of the tool mounting assembly and tool shank.

Referring to the drawings and firstly to FIGS. 1 to 3, there is illustrated a tool mounting assembly 10 according to an embodiment of the invention, the mounting assembly 10 including a shank holder 11 which is adapted to be mounted onto a rectangular or square sectioned tool bar 12 shown in dotted outline in FIG. 1. The shank holder 11 includes a main body 13 which includes an outer mounting surface 14 adapted to be juxtaposed with a side face of the tool bar 12 and a flange 15 which extends normal to the surface 14 and which is adapted to be juxtaposed with the top (or bottom) face of the tool bar 12. A pair of L-shaped clamp bolts 16, one of which is shown in dotted outline in FIG. 1, extend in use around the other two faces of the tool bar 12 and pass through openings formed in bosses 17 and 18 on the flange 15 and main body 13 adjacent the surface 14 for threaded engagement with nuts to enable the holder 11 to be clamped to the tool bar 12. In the drawings, the flange 15 is juxtaposed with the top face of the tool bar 12 however the holder 11 may be inverted so that the flange 15 is juxtaposed with the bottom face of the tool bar 12. It will of course be appreciated that the holder 11 may be attached to any form of tool bar, frame or machinery and may be attached thereto by any suitable arrangement. Further the holder 11 as shown in FIG. 1 is shown forwardly of the tool bar 13 however it may be positioned on the rear side of the tool bar 12.

Figure 4:
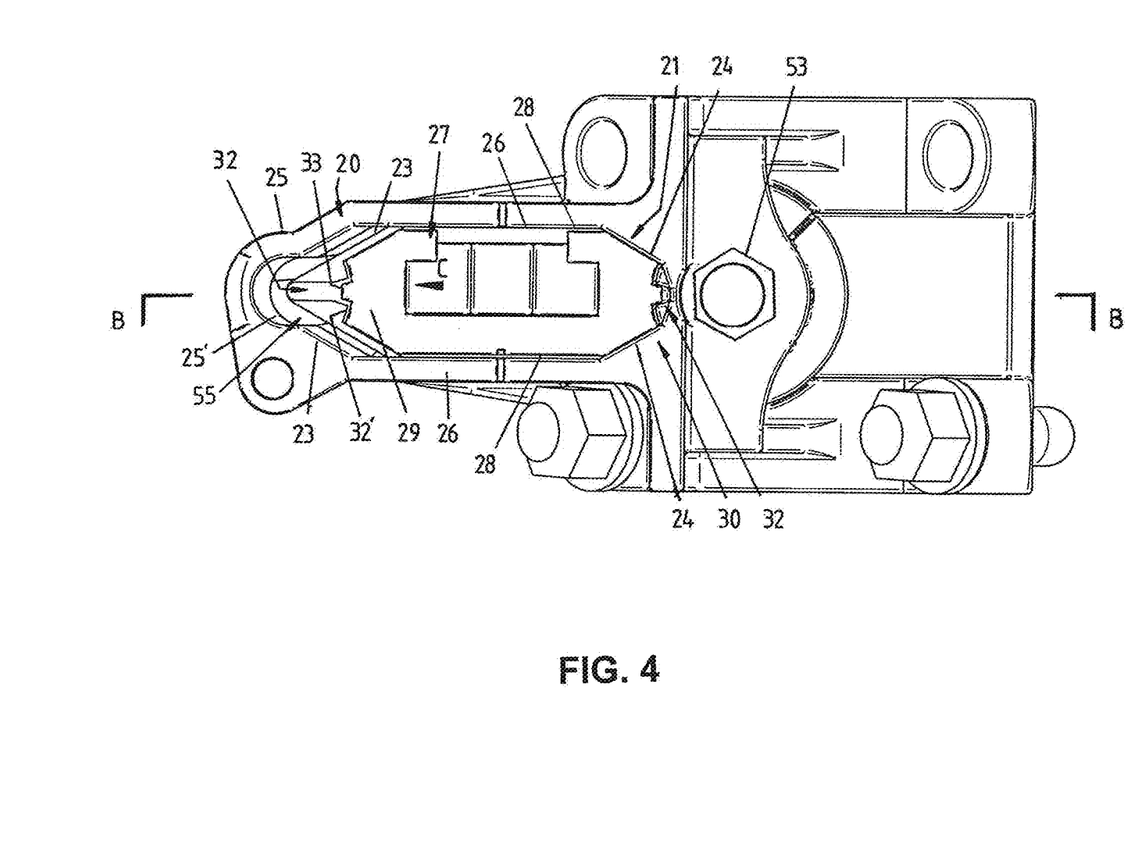
FIG. 4 is a top view of the tool mounting assembly and tool shank with the wedge member removed.

The holder 11 includes as shown also in FIG. 4, an elongated passage 19 which extends through the holder body 13 in a direction generally parallel to the surface 14 from one end to the other end of the body 13, the passage 19 being of oblong form in cross section. The passage 19 at its forward and rearward ends 20 and 21 is substantially V-shaped in cross section and tapers in cross-section longitudinally from the upper end of the body 13 towards the lower end to a region 22 where it is of minimum width. This is achieved by having the forward V-angled walls 23 of the passage 19 angled inwardly relative to the longitudinal axis X-X of the passage 19 from the top of the holder body 13 to the region 22 towards the lower end of the passage 19 after which the passage 19 is of a constant cross-section to its lower end. The V-angled walls 24 of the opposite end 21 of the passage 19 extend substantially parallel to the longitudinal axis X-X of the passage 19. A hollow longitudinally extending bead 25 which defines a longitudinally extending part-circular slot 25' is located between and joined to the V-angled walls 23.

The opposite side walls 26 of the passage 19 are substantially parallel to one another and spaced apart a distance slightly greater than the distance between the opposite sides of a shank 27 to be received in the passage 19 whereby the shank 27 may be moved freely longitudinally in the passage 19 until secured in position.

The shank 27 for use with the shank holder 10 is of elongated linear form having opposite parallel side walls 28 spaced apart a width slightly less than the distance between the walls 26 of the passage 19. The shank 27 has at least at one end but preferably its forward and trailing ends 29 and 30 of substantially V-shaped configuration in cross section so as to be complementary to the V-angled walls 24 of the passage 19. The lower portion of the passage in cross-section is thus substantially complementary to the cross-section of the shank 27. The ends 29 and 30 are formed with a plurality of transverse equi-spaced slots 31 defined between respective transversely extending teeth 32. The slots 31 follow a helical path centered on the central longitudinal axis of the shank 27 so that the teeth 32 also extend along that helical path. The outer surface 32' of each tooth is concave as is apparent in FIGS. 4, 7 and 8 and a longitudinally extending rib 33 projects centrally from the surface 32' on each tooth 32. The ribs 33 of the respective teeth 32 are longitudinally aligned. The region between the V-angled walls 23 and the adjacent end 29 or 30 of the shank 27 forms a tapering space down to the region 22 for a purpose which will be defined further below.

The tool mounting means of the shank 27 comprises a recess 34 at one end of the shank 27 (see FIG. 2) for receipt of a tang or the like of a range of earth working or other tools (for example as shown in dotted outline in FIG. 1) and a series of spaced openings 35 for different fasteners for tool attachment. The shank 27 as shown may have recesses 34 and openings 35 at each end so that the shank 27 can be reversed in attitude. In addition, the face 28 of the shank 27 opposite the recesses 34 may be recessed as is apparent in FIG. 4 for containing measurements or markers for setting the desired depth position of the shank 27 and thus tool mounted to the shank 27.

For adjusting the position of the shank 27 relative to the holder 11, a rotatable, adjuster 36 is mounted to the flange 15 for rotation about an axis extending longitudinally of the passage and substantially parallel to the axis of the lower portion of the holder passage 19 and located adjacent the rear end 21 of the passage 19. The body 13 of the holder carries a further flange 37 parallel to the flange 15 and defining with the flange 15 a recess 38 for receipt of the adjuster 36. The recess opens to the passage 19 via an opening or slot 39 (see FIGS. 8 and 9) to enable the adjuster 36 to project partially therethrough for engagement with the shank 27. The flange 37 has an opening 40 shown in FIG. 9 for receipt of a shaft or axle for the adjuster 36 which is aligned axially with a further enlarged opening 41 in the flange 15 (see FIG. 9).

Figure 5:
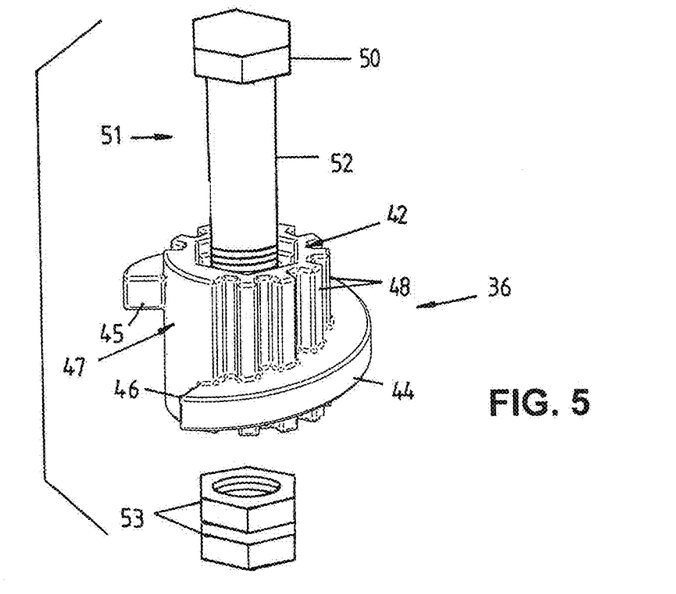
FIG. 5 is an exploded view of the adjuster assembly for the tool shank including the rotatable adjuster and retaining bolt assembly.
Figure 6:
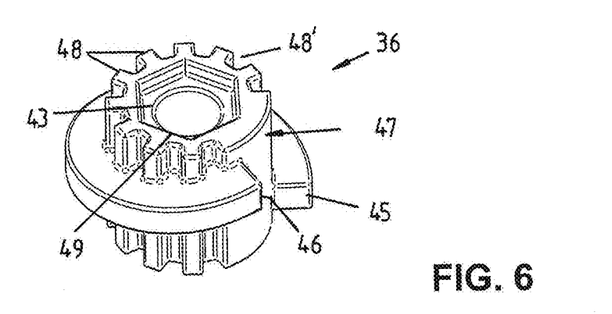
FIG. 6 is another view of the rotatable adjuster.
Figure 8:
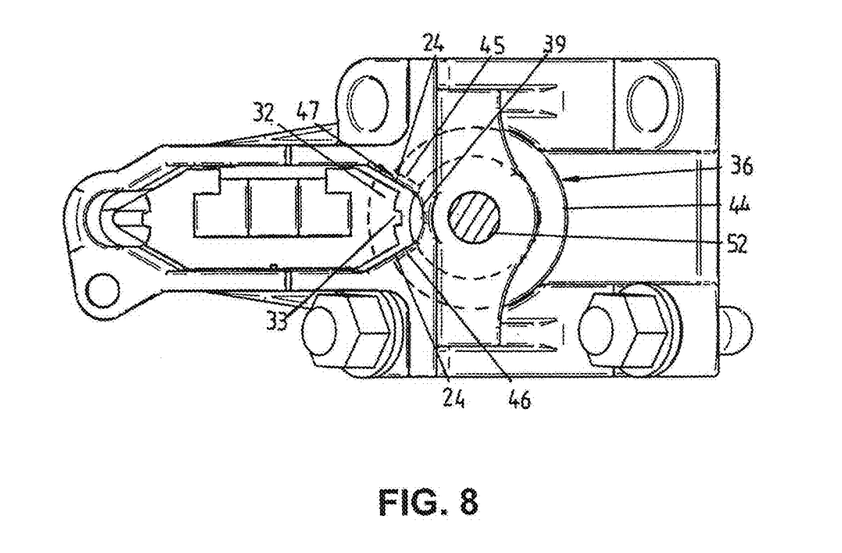

The adjuster 36 as shown in FIGS. 5 and 6 includes a main generally cylindrical body 42 having a central opening 43 therethrough and a radially outwardly projecting and helically extending rib 44 is formed on the body 42. The rib 44 does not extend 360 degrees around the body 42 but has opposite ends 45 and 46 which are axially offset and circumferentially spaced apart to define a gap 47 therebetween. The gap 47 is of substantially match the width of the V-shaped end 21 of the passage 19 where the rib 44 intersects the passage and the surfaces 45 and 46 are angled outwardly at an acute angle to each other to be capable of matching and be substantially aligned with the opposite V-angled walls 24 of the passage end 21 as shown in FIG. 8. The main body 42 is also formed with a plurality of circumferentially equi-spaced ridges or lands 48 which extend in an axial direction and above and below the helical rib 44. The ridges 48 however are not provided in the gap 47 between the ends 42 and 43 of the rib 44. The ridges 48 are spaced apart to define gaps 48' therebetween into which ribs 33 of the teeth 32 of the shank 27 may be received in a mating relationship as described further below. The concavity 32' of the teeth 32 substantially matches the radius on which the outer surfaces of the ridges 38 are located.

Figure 7:
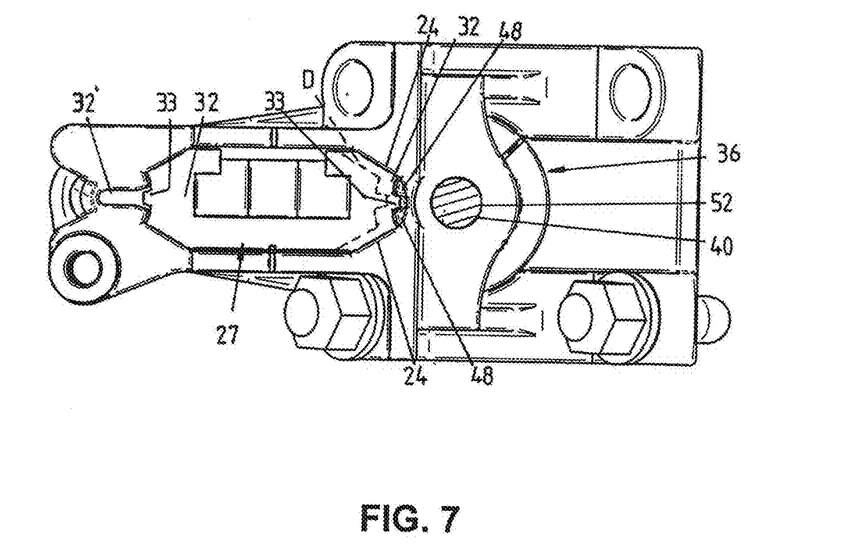
FIGS. 7 and 8 are cross sectional view along line A-A of FIG. 3 with the adjuster in different positions and with the wedge member removed in FIG. 8.

The main body 42 of the adjuster 36 is also provided on its lower side with a hexagonal recess 49 for complementary receipt of the hexagonal head 50 of a bolt 51 (see FIGS. 6 and 9) which defines the rotational axle for the body 42. The head 50 of the bolt 51 is received freely but rotatably in the enlarged opening 41 in the flange 15. The shaft 52 of the bolt 51 extends through the central opening 43 in the body 42 of the adjuster 36 and through the opening 40 in the flange 37 for engagement with a pair of nuts 53 which are tightened to such an extent to maintain the hexagonal head 50 of the bolt 51 within the recess 49 but not too tight to interfere with rotation of the body 42. The nuts 53 are also tightened against each other so that one nut 53 is locked to the other nut 53 and to the shaft 52 of the bolt 51. Thus rotation of a nut 53 by hand or with the aid of a tool will effect rotation of the shaft 52 and thus the head 50 and body 42 through cooperation of the head 50 with the recess 49. When the adjuster 36 is mounted in the recess 38 for rotation with the bolt 51, the rib 44 and ridges 48 can project into and be partially located in the passage 19 as shown in FIGS. 7, 8 and 9 for cooperation with the shank 27 as described further below.

Figure 9:
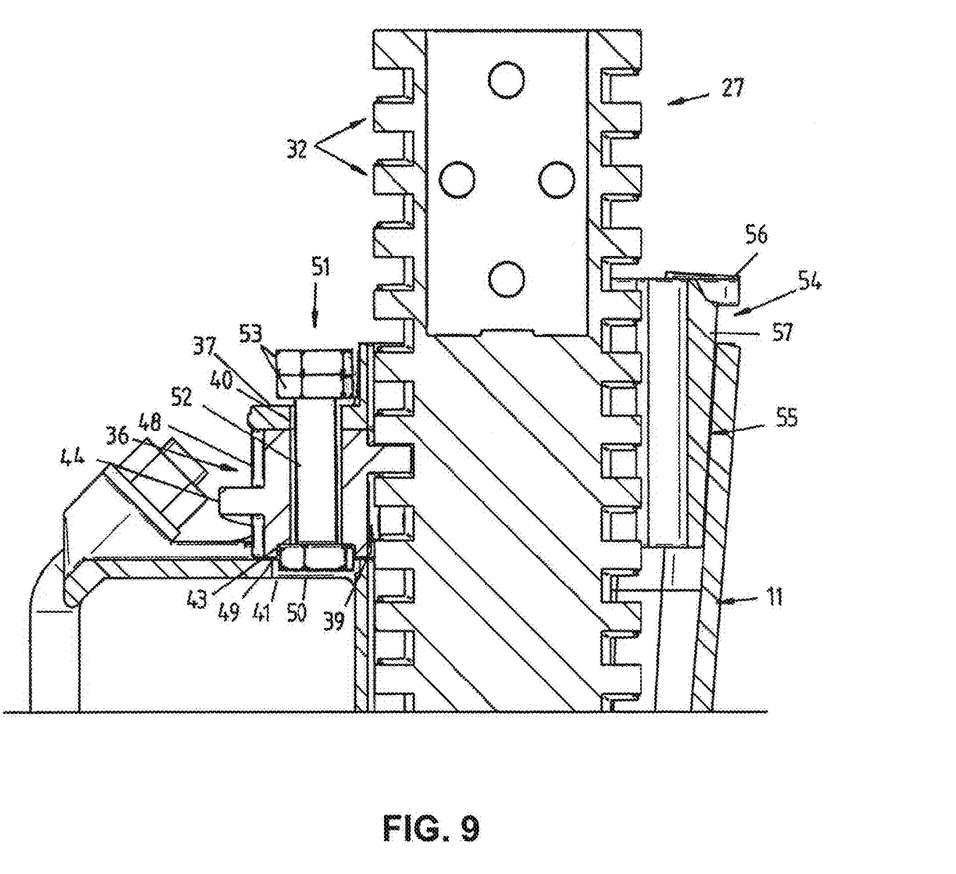
FIG. 9 is a cross-sectional view of the tool shank and tool mounting assembly in the direction B-B of FIG. 4 showing the adjuster engaged with the tool shank and wedge member in and operative position.
Figure 10:
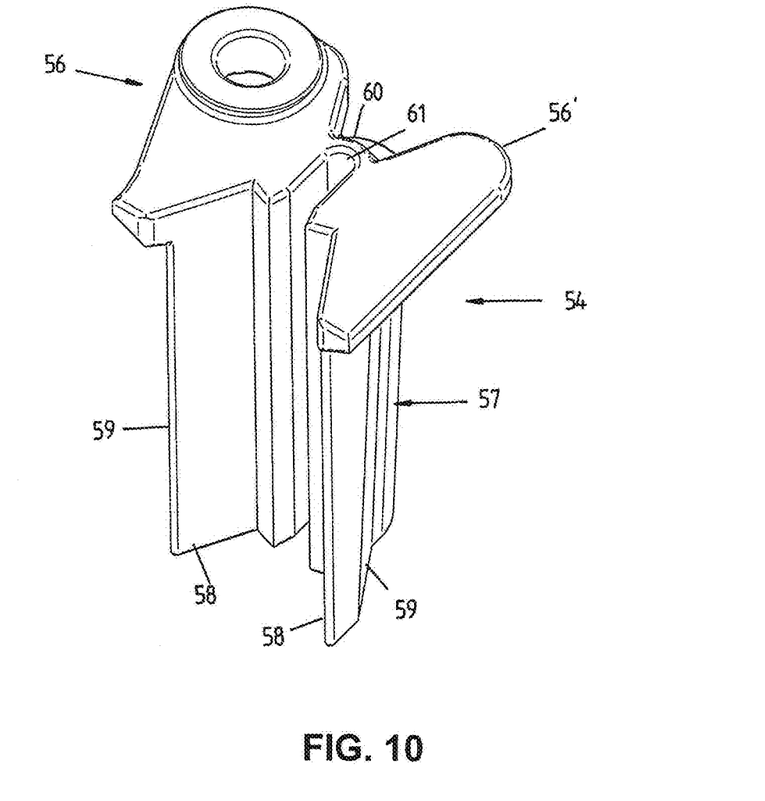
FIG. 10 is a further view of the wedge member used with the tool assembly.

To hold the shank 27 in an adjusted position in the holder 11, a wedge member 54 as shown more clearly in FIG. 9 to ills provided for wedging in the tapering space 55 defined between the end 20 of the passage 19 and edge 29 of the shank 27 when the shank 27 is received in the passage 19. The wedge member 54 include a head 56 comprising one or more flanges or plates 56' and a depending leg 57 which has front and rear pairs of angled surfaces 58 and 59, the surfaces 58 and 59 being in a generally V-shaped configuration and being adapted to cooperate with the rear end 20 of the holder passage 19 and V-shaped end 29 of the shank 27 respectively. The surfaces 59 are inclined inwardly towards the surfaces 58 so that the leg 37 tapers in thickness on opposite sides between the walls 58 and 59. A hollow bead 60 joins and is located at the apex of the V-shaped surfaces 58 and 59 and a slot 61 is formed in the bead 60 and extends the full length of the leg 57. The bead 60 is externally complementary to the slot 25' formed at the outer end of the passage 19.

Figure 11:
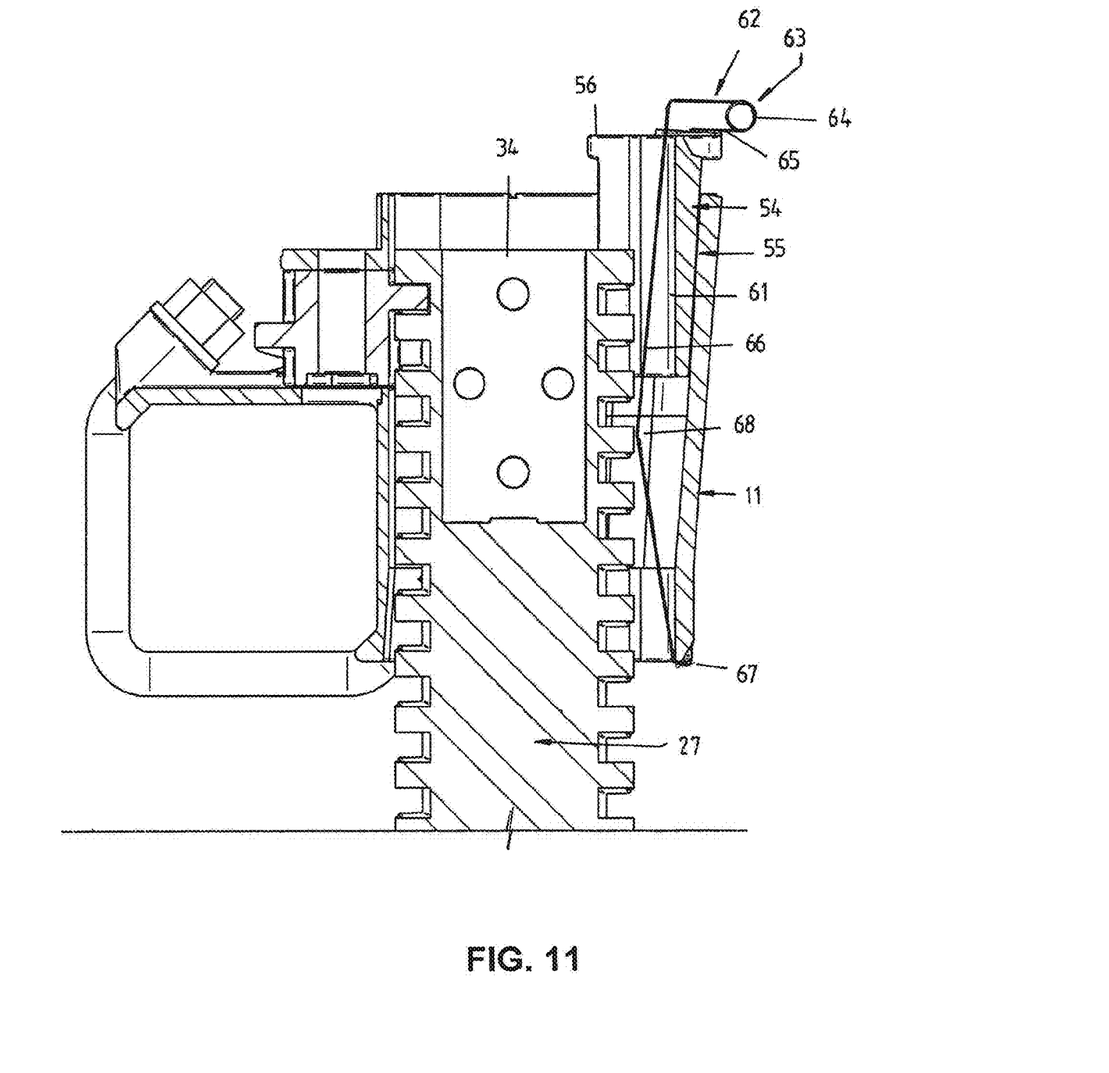
FIG. 11 is a further cross-sectional view of part of the tool shank and tool mounting assembly corresponding to the view of FIG. 9 but including the retaining clip for the wedge member.

To hold the wedge member 54 in position, an elongated spring clip 62 (see FIGS. 1, 3 and 11) is provided for engagement with a lower end of the holder passage 19 remote from the wedge member 54 and the head 56 of the wedge member 54. The dip 62 as shown in FIGS. 1 and 11 is formed of a resilient wire and has a head 63 defined by a looped portion 64 of the wire forming a torsion spring and terminating in a free arm 65 which can abut an upper portion of the head 56 of the wedge member 54 and apply an axial force to the head 56. The clip 62 has an elongated leg 66 (shown in dotted outline in FIG. 1) which extends from the head 63 and terminates in a hook 67 or turned back portion. The leg 66 is formed with a bend 68 intermediate its ends which divides the leg 66 into two obtusely angled parts.

In use and as shown in FIGS. 1 to 3, the shank holder 11 may be secured to the tool bar 12 using the L-shaped clamping bolts 16 so that the passage 19 of the holder 11 is substantially upright. The shank 27 is inserted into the passage 19 and set in a position longitudinally of the passage 19 by location of the rib 44 of the adjuster 36 between respective teeth 32 of the shank 27 as is illustrated in FIG. 9. In addition, one or more of the ribs 33 of the teeth 32 or adjacent teeth 32 of the shank 27 are located between a pair of ridges 48 of the adjuster 36 being received within and mating with the a recess 48' therebetween as shown in FIG. 7. The wedge member 54 is provided at the upper end of the holder 11 with the leg 57 thereof extending into the tapering space 55 between the opposing walls 23 of the passage 19 and end 29 of the shank 27. The wedging action provided by the wedge member 54 forces the rear end 30 of the shank 27 towards the rear walls 24 of the passage 19. The helical rib 44 of the adjuster 36 is received between respective teeth 32 which prevent longitudinal movement of the shank 27 relative to the passage 19. In addition, the location of the rib or ribs 33 of the teeth 32 in a gap 48' between adjacent ridges 48 of the adjuster 36 ensures that the adjuster 36 will be locked against rotation which also locks the shank 27 against longitudinal movement.

The wedge member 54 is retained in position by the clip 62, the leg 66 of which is inserted into the slot 61 until the hook 67 at the end of the leg 66 snaps into engagement with the lower end of the holder 11. In this position, the resilient free arm 65 of the clip 62 abuts the head 56 of the wedge member 54 and applies a resilient force thereto to urge the wedge member 54 downwardly. The bend 68 formed in the leg 66 ensures that the leg 66 is resiliently stressed through engagement of the bend 68 with the shank 17 which constrains the leg 66 laterally between the shank 17 and end 21 of the passage 19, This causes the two parts of the leg 66 on opposite sides of the bend 68 to be resiliently biased causing the hook 67 to snap into position to engage the end of the holder 11 as in FIG. 11.

When an earth working tool is attached to the shank 27 via a shank recess 34 and the tool is in use, the wedge member 54 will compensate for any vibration or movement in the tool shank 27 relative to the holder 11 because the resilient force applied by the arm 65 of the clip 62 will ensure a longitudinal force is always applied to the head 56 of the wedge member 54 to urge the wedge member 54 further longitudinally of the passage 19 and thereby maintain the wedging action. The wedge member 54 will thus be self tightening.

Where it is desired to apply a fine adjustment to the position of the shank 27, the spring clip 62 is removed to allow the wedge member 54 to be detached endwise from the holder 11. The shank 27 is then pivoted in the passage 19 in the direction C shown in FIG. 4 away from the adjuster 36 to the position shown in dotted outline in FIG. 7 to move the rib or ribs 33 of the teeth 32 out of register with the gap 48' between adjacent ridges 48. This is permitted because the shank 27 can move at least partially into the tapering space 55. The shank 27 however in this position will still have its teeth 32 engaged with the helical rib 44. The adjuster 36 can then be rotated with the shaft 52 either by hand by grasping the nuts 53 or with the assistance of a tool such as a spanner engaged with one of the nuts 53 which will cause through the thread like cooperation between the rib 44 and teeth 32 longitudinal movement of the shank 27 relative to the holder 11. When the desired longitudinal position of the shank 27 is reached, the shank 27 is pivoted or moved back towards the adjuster 36 so that the rib or ribs 33 of the teeth 32 can again locate in the gap 48' between adjacent ridges 48. Slight rotation of the adjuster 36 may be required to ensure this mating relationship occurs and that the shank 27 can nest within the walls 24 of the passage 19 as in FIGS. 4 and 7. The wedge member 54 may then be reinserted into the tapering passage 55 and the clip 62 re-applied via the passage 61 in the wedge member 54 to engage the end of the holder 11 and hold the wedge member 54 in position as in FIGS. 1 to 3 and FIG. 11.

For course adjustment of the position of the shank 27, the same procedure as described above is adopted however after the shank 27 is moved in the direction C to free the rib or ribs 33 from the gap 48' between adjacent ridges 48, the adjuster 36 is rotated until the gap 47 between the ends of the rib 45 and 46 is moved into the passage 19 so that the ends 45 and 46 of the rib 44 are substantially aligned with the walls 24 of the passage 19 as shown in FIG. 8. The shank 27 can then be moved back towards the adjuster 36 and locate in the gap 47. There is now no impediment to longitudinal sliding movement of the shank 27 relative to the holder 11 which can be coarsely adjusted longitudinally through the gap 47 by hand to a position at or near its desired position. At this position, the adjuster 36 can again be rotated to cause the helical rib 44 to locate between adjacent teeth 32 of the shank 27. Further rotation of the adjuster 36 will cause through the thread-like action between the rib 44 and teeth 32, fine adjustment of the shank 27 longitudinally of the passage 19 of the holder 11. When the desired position is reached, the wedge member 54 is applied and held in position by the clip 62. This ensures that the adjuster 36 is locked against rotation through engagement between the teeth 33 and ridges or lands 48 which locks the shank 27 against further longitudinal movement relative to the holder 11 as described above.

The arrangement described above permits both fine and course adjustment of the shank relative to the holder 11 thereby allowing a large range of different tools to be mounted to the tool shank 27 and adjusted to a desired working depth. Whilst the ends of the shank 27 are preferably of V-shaped form and the ends of the passage 19 and leg 57 of the wedge member 54 correspondingly shaped, they may be of other configurations such as or part circular form or of multi surface form in cross section. The shank holder 11, wedge member 54 and shank 27 and other components can be made of any suitable material such as by being cast metal and by any suitable method known to those skilled in the art.

As an alternative to the spring clip 62, alternative fastener arrangements can be used between the head end member 56 of the wedge member 54 and shank holder 11 to hold the wedge member 54 in position and urge it longitudinally into the tapering space 55. Such fastener arrangements may comprise a simple bolt between flanges on the end member 56 and shank holder body 13 or a resilient or spring type fastener such as an elastic element which will urge the wedge member 54 longitudinally to maintain the wedging action.

The reference to prior art herein is not to be taken as an admission that such prior art constitutes common general knowledge in the art. Further the terms "comprising" or "comprises" as used throughout the specification are taken to specify the presence of the stated features, integers and components referred to but not preclude the presence or addition of one or more other feature/s, integer/s, component/s or group thereof.

Whilst the above has been given by way of illustrative embodiment of the invention, all such modifications and variations thereto as would be apparent to persons skilled in the art are deemed to fall within the broad scope and ambit of the invention as defined in the appended claims.

The invention claimed is:

1. A tool mounting assembly comprising a shank holder having an elongated passage therethrough and an elongated tool shank for an earth working or agricultural tool received within said passage, said shank having a leading end and a trailing end and opposite side faces, at least one of the ends being provided with a plurality of longitudinally spaced teeth, said teeth extending along a helical path and in a transverse direction relative to the longitudinal axis of said shank, a rotatable adjuster mounted on said shank holder for rotation about an axis extending longitudinally of said shank, said rotatable adjuster having a main rotatable body and a helically extending rib on said body, said rotatable adjuster being adapted in a first position of said shank to cooperate with said shank such that said rib meshes with said teeth whereby said adjuster when rotated, can adjust the position of said shank longitudinally of said passage to vary in use the operating depth of said tool, said shank being movable to a second position and releasable retaining means for releasably retaining said shank in said second position, said shank in said second position cooperating with said adjuster to lock said adjuster against rotation and said helically extending rib in mesh with said teeth, on said shank to maintain said shank in a substantially fixed position longitudinally of said passage and said body of said adjuster being further rotatable to a position in which the helically extending rib is not engaged with the teeth so as to allow longitudinal movement of the shank in opposite directions relative to the holder for coarse adjustment of the position of the shank.

2. A tool mounting assembly as claimed in claim 1 wherein said rib extends less than 360 degrees around the body of the adjuster and has opposite ends arranged at axially offset and spaced apart circumferential positions around the main body, the spacing between the ends of the rib defining a gap which can be aligned with the passage upon rotation of said adjuster which permits said shank to move longitudinally of the passage for course adjustment thereof.

3. A tool mounting assembly as claimed in claim 1 wherein each said tooth of said shank has at least one longitudinally extending rib on its outer surface and wherein said adjuster is adapted to cooperate with one or more ribs on one or more of the teeth so as to be locked against rotation in said second position of said shank.

4. A tool mounting assembly as claimed in claim 3 wherein said body of said adjuster has a plurality of longitudinally extending circumferentially spaced apart lands or ridges defining slots or gaps therebetween for receiving a rib or ribs of a tooth or teeth to lock the adjuster against rotation.

5. A tool mounting assembly as claimed in claim 4 wherein said adjuster is located within a recess within the shank holder and mounted for rotation therein on a central pin or shaft in a position in which said lands or ridges can project into said passage, said pin or shaft being rotatable with said adjuster whereby rotation of the pin or shaft will effect rotation of the adjuster.

6. A tool mounting assembly as claimed in claim 1 wherein said retaining means comprises a wedge member adapted for wedging between the shank and a wall of the passage to prevent said shank from disengagement from the adjuster and thereby said shank in said second fixed position.

7. A tool mounting assembly as claimed in claim 6 and including means for urging the wedge member longitudinally of the passage to maintain wedging cooperation between the wall of the holder passage and shank.

8. A tool mounting assembly as claimed in claim 7 wherein said wedge member includes a head and a leg depending therefrom for location in said passage and wherein said urging means comprises a resilient clip, said clip comprising an elongated member having means at one end for cooperation with the holder and means at the opposite end which apply a resilient force to the head of the wedge member.

9. A tool mounting assembly comprising a shank holder having an elongated passage therethrough and an elongated tool shank received within said passage, said tool shank including mounting means for mounting an earth working or agricultural tool, said shank having a leading end and a trailing end and opposite side faces, at least one of the ends being provided with longitudinally spaced teeth, each said tooth including one or more longitudinally extending ribs and a rotatable adjuster mounted on said shank holder for rotation about an axis extending longitudinally of said shank, said adjuster having one or more lands or ridges, retaining means for retaining said shank in a position in which said one or more longitudinally extending ribs on said teeth cooperate with one or more lands or ridges on said adjuster to look said adjuster against rotation to thereby hold said shank fixed relative to said passage, said retaining means being releasable to permit said shank to move to a further position in which said adjuster can rotate and cause through cooperation with said teeth movement of said shank longitudinally of said passage to vary in use the operating depth of said tool.

10. A tool mounting assembly as claimed in claim 9 wherein said adjuster has a main body carrying said lands or ridges and a rib extending helically at least partially around said body, said rib being adapted to mesh with said teeth whereby rotation of said adjuster in said further position of said shank causes said movement of said shank longitudinally of said passage.

11. A tool mounting assembly as claimed in claim 10 wherein said rib extends partway around said main body and has opposite circumferentially spaced apart ends defining a gap therebetween, said adjuster being rotatable to a position in which said gap is aligned with said passage, said shank being movable along said passage and through said gap for coarse adjustment of the position of said shank.

12. A tool mounting assembly as claimed in claim 9 wherein said passage includes a first portion substantially complementary to said shank, said passage diverging in cross-section from said first portion towards an end of said passage to define a tapering space for said retaining means, said tool shank being movable into said tapering space upon removal of said retaining means to enable said one or more ribs on said one or more teeth to disengage from said one or more lands or ridges on said adjuster to allow rotation of said adjuster.

* * * * *